(12) United States Patent
Geathers et al.

(10) Patent No.: US 9,919,944 B2
(45) Date of Patent: Mar. 20, 2018

(54) APPARATUS AND METHODS FOR MANUFACTURING GLASS

(71) Applicant: Corning Incorporated, Corning, NY (US)

(72) Inventors: Eliot Geathers, Painted Post, NY (US); Kashyap Harshadlal Shah, Painted Post, NY (US); Yuriy Yurkovsky, Corning, NY (US)

(73) Assignee: Corning Incorporated, Corning, NY (US)

( * ) Notice: Subject to any disclaimer, the term of this patent is extended or adjusted under 35 U.S.C. 154(b) by 233 days.

(21) Appl. No.: 14/460,447

(22) Filed: Aug. 15, 2014

(65) Prior Publication Data

US 2016/0046518 A1    Feb. 18, 2016

(51) Int. Cl.
*C03B 17/06* (2006.01)
*C03B 25/12* (2006.01)

(52) U.S. Cl.
CPC ............ *C03B 17/067* (2013.01); *C03B 25/12* (2013.01)

(58) Field of Classification Search
CPC ..... C03B 17/06; C03B 17/064; C03B 17/067; C03B 25/12
See application file for complete search history.

(56) References Cited

U.S. PATENT DOCUMENTS

| | | | |
|---|---|---|---|
| 2,725,679 A * | 12/1955 | Long | C03B 25/12 65/118 |
| 3,223,502 A | 12/1965 | Ward et al. | |
| 4,140,512 A | 2/1979 | Carmi et al. | |
| 4,280,483 A * | 7/1981 | Schaffer | F24J 2/0444 126/618 |
| 4,787,843 A * | 11/1988 | Huffman | C30B 15/14 165/104.27 |
| 8,176,753 B2 * | 5/2012 | Kahlout | C03B 17/064 65/193 |
| 8,875,543 B2 * | 11/2014 | Dannoux | C03B 17/06 65/67 |

(Continued)

FOREIGN PATENT DOCUMENTS

WO    2007/090942    8/2007
WO    2011066064 A2    6/2011

(Continued)

*Primary Examiner* — Queenie S Dehghan
(74) *Attorney, Agent, or Firm* — Kevin M. Able

(57) ABSTRACT

A method and apparatus for manufacturing glass are provided. The apparatus is configured to draw a glass ribbon and includes an evaporator unit having a liquid reservoir configured to receive a working liquid. The apparatus further includes a heat transfer element configured to be placed in thermal contact with the working liquid received in the liquid reservoir. The heat transfer element is configured to cool the glass ribbon being drawn from the glass manufacturing apparatus by receiving radiant heat from the glass ribbon and transferring the heat to the working liquid received in the liquid reservoir, thereby transforming an amount of the working liquid to a vapor. The method includes drawing the glass ribbon, cooling the glass ribbon by radiating heat from the glass ribbon to the heat transfer element, and then transferring heat from the heat transfer element to the working liquid.

20 Claims, 6 Drawing Sheets

(56) References Cited

U.S. PATENT DOCUMENTS

| | | | |
|---|---|---|---|
| 2007/0140311 A1* | 6/2007 | House | C03B 17/064 374/100 |
| 2007/0230128 A1* | 10/2007 | Kim | F28D 15/02 361/699 |
| 2012/0047951 A1* | 3/2012 | Dannoux | C03B 17/06 65/25.3 |
| 2012/0318020 A1 | 12/2012 | Delia et al. | |
| 2013/0118206 A1* | 5/2013 | Maeda | C03B 17/064 65/91 |
| 2013/0133368 A1 | 5/2013 | Fournel | |
| 2013/0305784 A1* | 11/2013 | Gromann | C03B 5/0336 65/29.14 |
| 2015/0329401 A1* | 11/2015 | Chung | C03B 17/068 65/53 |

FOREIGN PATENT DOCUMENTS

| | | |
|---|---|---|
| WO | 2011/090893 | 7/2011 |
| WO | 2012/001236 | 1/2012 |

\* cited by examiner

APPARATUS AND METHODS FOR MANUFACTURING GLASS

FIELD

The present disclosure relates generally to apparatus and methods for manufacturing glass, and more particularly, to apparatus and methods that draw and cool a glass ribbon.

BACKGROUND

Glass sheets are commonly used, for example, in display applications, for example liquid crystal displays (LCDs), electrophoretic displays (EPD), organic light emitting diode displays (OLEDs), plasma display panels (PDPs), or the like. Various glass manufacturing apparatus and methods may be used to produce a glass ribbon that may be further processed into one or more glass sheets. For instance, the glass manufacturing apparatus may be configured to form a glass ribbon by a down-draw, up-draw, float, fusion, press rolling, slot draw, or other glass forming techniques.

SUMMARY

The following presents a simplified summary of the disclosure in order to provide a basic understanding of some example aspects described in the detailed description.

In a first example aspect, a glass manufacturing apparatus configured to draw a glass ribbon comprises an evaporator unit comprising a liquid reservoir configured to receive a working liquid and a heat transfer element configured to be placed in thermal contact with the working liquid received in the liquid reservoir. The heat transfer element is configured to cool the glass ribbon being drawn from the glass manufacturing apparatus by receiving radiant heat from the glass ribbon and transferring the heat to the working liquid received in the liquid reservoir, thereby transforming an amount of the working liquid to a vapor.

In one example of the first aspect, the glass manufacturing apparatus further comprises a condenser unit in fluid communication with the evaporator unit. The condenser unit is configured to condense the vapor to a condensed working liquid, and deliver the condensed working liquid back to the liquid reservoir. For instance, in one example, the glass manufacturing apparatus is configured such that the condensed working liquid is gravity fed to the liquid reservoir.

In another example of the first aspect, the glass manufacturing apparatus further comprises an auxiliary liquid reservoir configured to selectively supply additional working liquid to the liquid reservoir.

In still another example of the first aspect, the glass manufacturing apparatus further comprises an induction coil configured to selectively provide electromagnetic energy to the heat transfer element. In one example, the heat transfer element is configured to convert the electromagnetic energy to heat and transfer the heat radiantly to the glass ribbon. In another example, the induction coil is provided within the liquid reservoir. In yet another example, the glass manufacturing apparatus further comprises an isolation chamber configured to isolate the induction coil from contacting the working liquid received in the liquid reservoir.

In yet another example of the first aspect, the glass manufacturing apparatus further comprises the working liquid, wherein the working liquid is water.

In still yet another example of the first aspect, the heat transfer element defines a wall portion of the liquid reservoir.

The first aspect may be provided alone or in combination with one or more of the examples of the first aspect discussed above.

In a second example aspect, a method of manufacturing glass comprises drawing a glass ribbon from a quantity of molten material. The method further comprises cooling the glass ribbon by radiating heat from the glass ribbon to a heat transfer element, and then transferring heat from the heat transfer element to a working liquid in a liquid reservoir, thereby transforming an amount of the working liquid to a vapor.

In one example of the second aspect, the method further comprises the step of adjusting a cooling rate of the heat transfer element by adjusting a saturation temperature of the working liquid in the liquid reservoir. For instance, in one example, the saturation temperature of the working liquid is adjusted by adjusting a fluid pressure of the liquid reservoir.

In another example of the second aspect, the method further comprises the step of adjusting a cooling rate of the heat transfer element by adjusting an area of thermal contact between the working liquid and the heat transfer element. In one example, the cooling rate of the heat transfer element is further adjusted by adjusting a saturation temperature of the working liquid in the liquid reservoir. For instance, in one example, the saturation temperature of the working liquid is adjusted by adjusting a fluid pressure of the liquid reservoir.

In yet another example of the second aspect, the method further comprises the step of condensing the vapor to a condensed working liquid and supplying the condensed working liquid to the liquid reservoir. For instance, in one example, the condensed working liquid is supplied to the liquid reservoir by gravity feeding the condensed working liquid to the liquid reservoir.

In still another example of the second aspect, the method further comprises the step of supplying electromagnetic energy to the heat transfer element, wherein the heat transfer element is configured to convert the electromagnetic energy into radiant heat. In one example, the radiant heat provided by the electromagnetic energy is transferred radiantly to the glass ribbon.

The second aspect may be provided alone or in combination with one or more of the examples of the second aspect discussed above.

BRIEF DESCRIPTION OF THE DRAWINGS

These and other features, aspects and advantages of the present disclosure are better understood when the following detailed description is read with reference to the accompanying drawings, in which.

DETAILED DESCRIPTION

Figure 1:
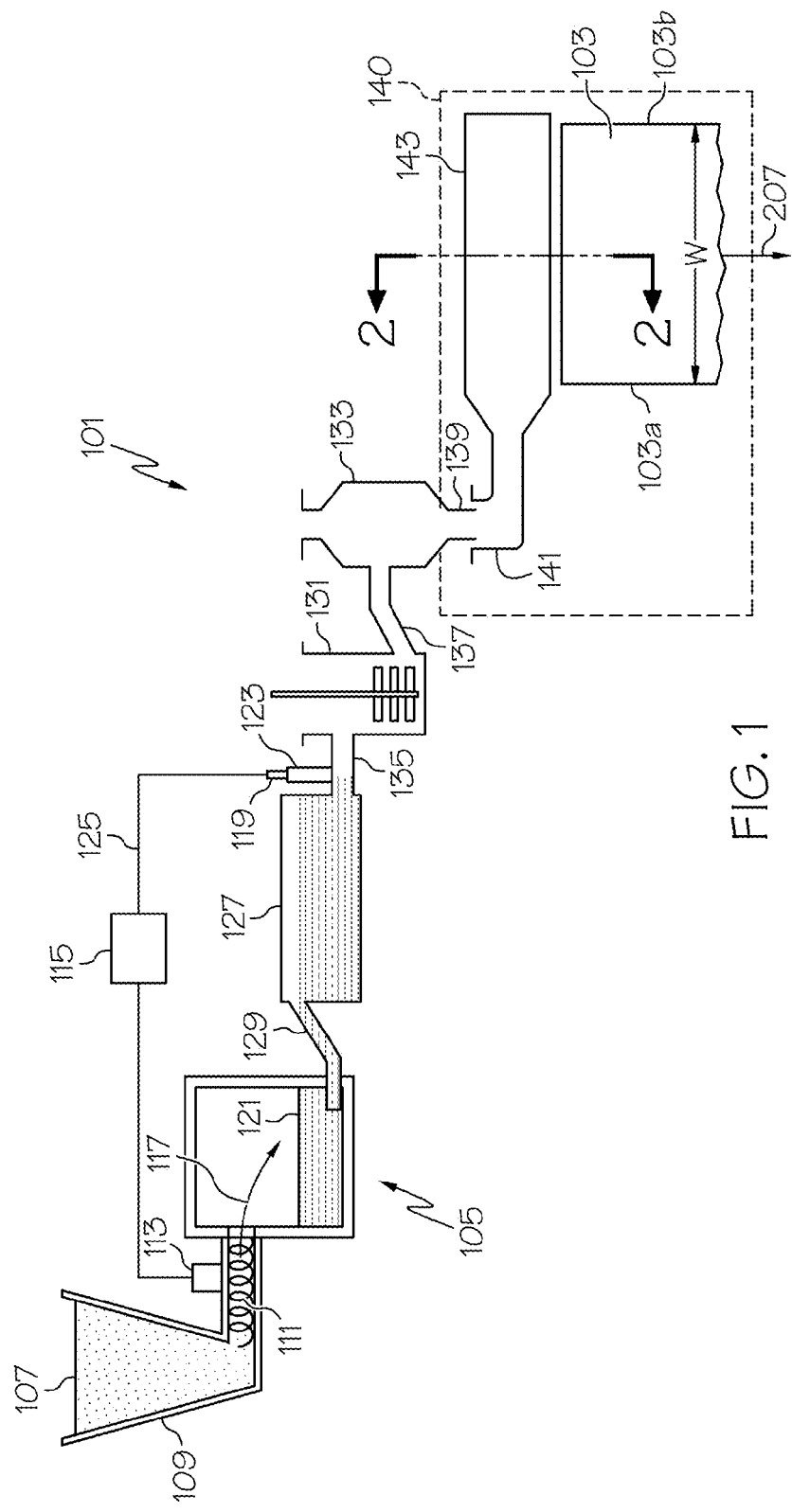
FIG. 1 schematically illustrates an example glass manufacturing apparatus for manufacturing glass.

Apparatus and methods will now be described more fully hereinafter with reference to the accompanying drawings in which example embodiments of the disclosure are shown. Whenever possible, the same reference numerals are used throughout the drawings to refer to the same or like parts. However, this disclosure may be embodied in many different forms and should not be construed as limited to the embodiments set forth herein.

Various glass manufacturing apparatus and methods of the disclosure may be used to produce a glass ribbon that may be further processed into one or more glass sheets. For instance, the glass manufacturing apparatus may be configured to form a glass ribbon by a down-draw, up-draw, float, fusion, press rolling, slot draw, or other glass forming techniques. By way of example, example down-draw apparatus and methods are described and illustrated although other glass manufacturing techniques may be used in further examples.

FIG. 1 schematically illustrates an example glass manufacturing apparatus 101 configured to carry out a fusion down-draw process to manufacture glass sheets. As illustrated, the glass manufacturing apparatus 101 can include a melting vessel 105 configured to receive batch material 107 from a storage bin 109. The batch material 107 can be introduced by a batch delivery device 111 powered by a motor 113. An optional controller 115 can be configured to activate the motor 113 to introduce a desired amount of batch material 107 into the melting vessel 105, as indicated by arrow 117. A metal probe 119 can be used to measure a level of molten glass 121 within a standpipe 123 and communicate the measured information to the controller 115 by way of a communication line 125.

The glass manufacturing apparatus 101 can also include a fining vessel 127, such as a fining tube, located downstream from the melting vessel 105 and coupled to the melting vessel 105 by way of a first connecting tube 129. A mixing vessel 131, such as a stir chamber, can also be located downstream from the fining vessel 127 and a delivery vessel 133 may be located downstream from the mixing vessel 131. As shown, a second connecting tube 135 can couple the fining vessel 127 to the mixing vessel 131 and a third connecting tube 137 can couple the mixing vessel 131 to the delivery vessel 133. As further illustrated, a downcomer 139 can be positioned to deliver molten glass 121 from the delivery vessel 133 to a drawing apparatus. The glass manufacturing apparatus 101, including the illustrated fusion draw machine 140, is configured to draw molten glass into a glass ribbon as discussed more fully below. In one example, the fusion draw machine 140 can include a forming vessel 143 provided with an inlet 141 to receive molten glass from the downcomer 139.

As shown, the melting vessel 105, fining vessel 127, the mixing vessel 131, delivery vessel 133, and forming vessel 143 are examples of molten glass stations that may be located in series along the glass manufacturing apparatus 101.

The melting vessel 105 is typically made from a refractory material, such as refractory (e.g. ceramic) brick. The glass manufacturing apparatus 101 may further include components that are typically made from platinum or platinum-containing metals such as platinum-rhodium, platinum-iridium and combinations thereof, but which may also comprise such refractory metals such as molybdenum, palladium, rhenium, tantalum, titanium, tungsten, ruthenium, osmium, zirconium, and alloys thereof and/or zirconium dioxide. The platinum-containing components can include one or more of the first connecting tube 129, the fining vessel 127 (e.g., finer tube), the second connecting tube 135, the standpipe 123, the mixing vessel 131 (e.g., a stir chamber), the third connecting tube 137, the delivery vessel 133 (e.g., a bowl), the downcomer 139 and the inlet 141. The forming vessel 143 is also made from a refractory material and is designed to form the glass ribbon 103.

Figure 2:
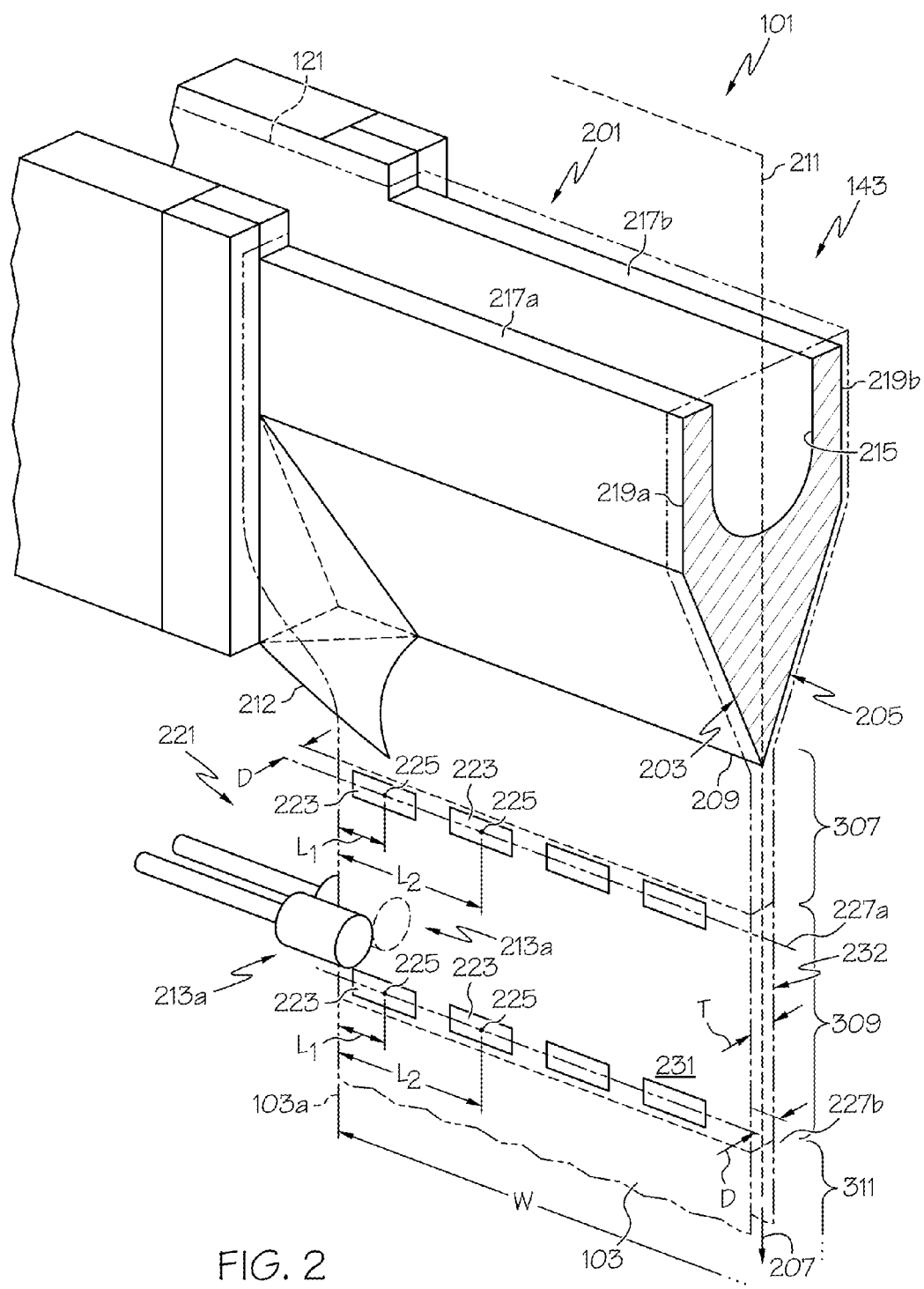
FIG. 2 illustrates a cross-sectional perspective view of the glass manufacturing apparatus along line 2-2 of FIG. 1.

FIG. 2 is a cross-sectional perspective view of the glass manufacturing apparatus 101 along line 2-2 of FIG. 1. As shown, the forming vessel 143 includes a forming wedge 201 comprising a pair of downwardly inclined forming surface portions 203, 205 extending between opposed ends of the forming wedge 201. The pair of downwardly inclined forming surface portions 203, 205 converge along a draw direction 207 to form a root 209. A draw plane 211 extends through the root 209 wherein the glass ribbon 103 may be drawn in the draw direction 207 along the draw plane 211. As shown, the draw plane 211 can bisect the root 209 although the draw plane 211 may extend at other orientations with respect to the root 209.

As shown in FIG. 2, the glass ribbon 103 is drawn from the root 209 with a first major surface 231 and a second major surface 232. As shown, the first major surface 231 and the second major surface 232 face opposite directions with a thickness T of the glass ribbon 103 defined between the first major surface 231 and the second major surface 232.

Figure 3:
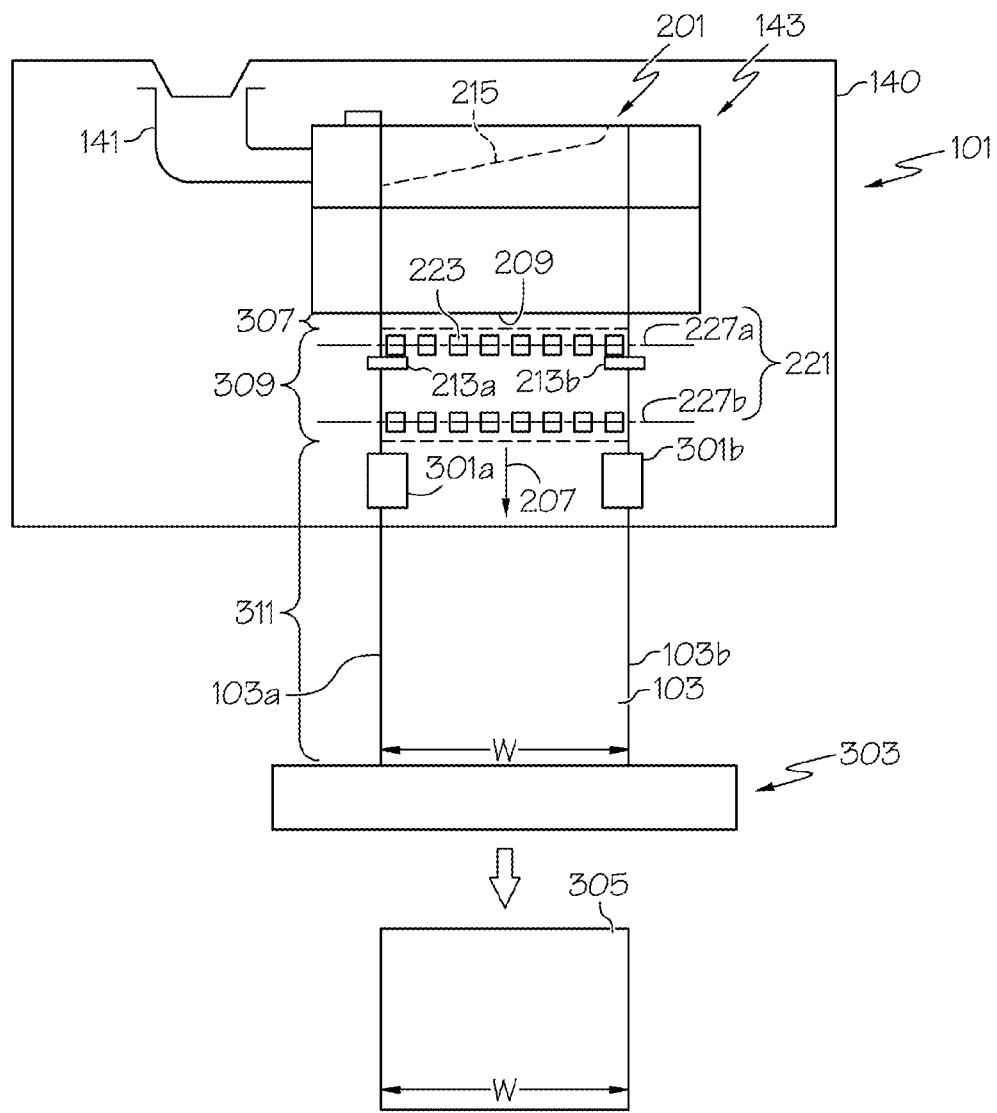
FIG. 3 schematically illustrates a glass ribbon being drawn off the forming vessel of FIG. 1.

The glass manufacturing apparatus 101 for fusion drawing a glass ribbon can also include at least one edge roller assembly including a pair of edge rollers configured to engage a corresponding edge 103a, 103b of the glass ribbon 103 as the ribbon is drawn off the root 209 of the forming wedge 201. The pair of edge rollers facilitates proper finishing of the edges of the glass ribbon. Edge roller finishing provides desired edge characteristics and proper fusion of the edge portions of the molten glass being pulled off opposed surfaces of an edge director 212 associated with the pair of downwardly inclined forming surface portions 203, 205. As shown in FIG. 2, a first edge roller assembly 213a is associated with the first edge 103a. FIG. 3 shows a second edge roller assembly 213b associated with the second edge 103b of the glass ribbon 103.

As shown in FIG. 3, the glass manufacturing apparatus 101 can further include a first and second pull roll assembly 301a, 301b for each respective edge 103a, 103b to facilitate pulling of the glass ribbon 103 in the draw direction 207 of the draw plane 211. Also shown in FIG. 3, the glass manufacturing apparatus 101 can include a cutting device 303 that allows the glass ribbon 103 to be cut into distinct glass sheets 305. The glass sheets 305 may be subdivided into individual glass sheets for incorporating in the various display devices, such as a liquid crystal display (LCD).

Referring to FIG. 2, in one example, the molten glass 121 can flow into a trough 215 of the forming vessel 143. The molten glass 121 can then simultaneously flow over corresponding weirs 217a, 217b and downward over the outer surfaces 219a, 219b of the corresponding weirs 217a, 217b. Respective streams of molten glass then flow along the downwardly inclined forming surface portions 203, 205 to the root 209 of the forming vessel 143, where the flows converge and fuse into the glass ribbon 103. The glass ribbon 103 is then drawn off the root 209 in the draw plane 211 along draw direction 207.

As shown in FIGS. 2-3, glass manufacturing apparatus 101 can include a heat transfer apparatus 221. For instance, as shown in FIG. 2, the heat transfer apparatus 221 can include a plurality of heat transfer units 223 that can be positioned at respective lateral locations 225 along at least one heat transfer axis extending transverse, such as perpendicular, to the draw direction 207. The heat transfer apparatus 221 can be located within the fusion draw machine 140, as shown in FIG. 3, or the heat transfer apparatus 221 can be located downstream of the fusion draw machine 140. As will be discussed below in further detail, the heat transfer units 223 of the heat transfer apparatus 221 can be operated to provide controlled cooling or heating of the glass ribbon 103.

As shown, the heat transfer apparatus 221 can provide the at least one axis as a first heat transfer axis 227a and a second heat transfer axis 227b, although a single or three or more heat transfer axes may be provided in further examples. As shown, the first and second heat transfer axis 227a, 227b can each comprise a substantially straight axis although curved or other axis shapes may be provided in further examples. Still further, the first and second heat transfer axis 227a, 227b are substantially parallel to one another although the axes may be angled with respect to one another in further examples.

The heat transfer axis may be located in a wide variety of elevations with respect to the glass ribbon. For example, as shown in FIGS. 2 & 3, the first and second heat transfer axis 227a, 227b are located within the setting zone 309. In addition, or alternatively, each or at least one heat transfer axis may be located within the viscous zone 307 and/or within the elastic zone 311 in further examples.

As mentioned previously, as shown in FIG. 2, the plurality of heat transfer units 223 can be located at respective lateral locations 225, wherein the heat transfer units 223 are configured to transfer heat between the glass ribbon 103 and the heat transfer units 223 along the width W of the glass ribbon 103. For example, as shown in FIG. 2, each of the plurality of heat transfer units 223 on each heat transfer axis may be spaced from one another in series along the respective heat transfer axis. One of the heat transfer units 223 may be located at a lateral location 225 that is a distance L1 from the edge 103a of the glass ribbon 103 while the adjacent heat transfer units 223 can be located a distance L2 from the edge 103a that is greater than the distance L1. In some examples the heat transfer units 223 can be spaced equally from one another along the width W of the glass ribbon although the heat transfer units may be located at different distances relative to the edges 103a, 103b of the glass ribbon. For example, the heat transfer units 223 may be located closer together near the edges 103a, 103b when compared to a central region of the glass ribbon 103 to allow greater transfer of heat at the edges than the central portion of the glass ribbon.

The plurality of heat transfer units 223 can be configured to transfer heat radiantly between the glass ribbon 103 and the heat transfer units 223, thus allowing the plurality of heat transfer units 223 to be spaced away from the glass ribbon 103 so that the heat transfer units 223 do not physically contact the glass ribbon 103. For example, as shown in FIG. 2, the plurality of heat transfer units 223 along the first heat transfer axis 227a can be located a distance D away from the first major surface 231 of the glass ribbon 103. The plurality of heat transfer units 223 along the second heat transfer axis 227b can also be located the distance D away from the first major surface 231. In some examples, one of the heat transfer units 223 may be located the distance D away from the first major surface 231 while another one of the heat transfer units is located a different distance away from the first major surface 231. Indeed, each of the plurality of heat transfer units 223 can be located at any various distances from the first major surface 231.

Still further, the plurality of heat transfer units 223 are illustrated as extending in a spaced relation to a first major surface 231. Although not shown, in further examples, further heat transfer units 223 may extend in a spaced relation with a second major 232 surface of the glass ribbon 103 that is opposite the first major surface 231. In one example, an identical configuration of heat transfer units 223 may be provided along the second major surface 232 that mirrors the configuration of the heat transfer units 223 provided along the first major surface 231. Providing heat transfer units 223 spaced from both the first and second major surfaces 231, 232 of the glass ribbon 103 can help provide uniform heat transfer across the thickness T of the glass ribbon. In further examples, heat transfer units 223 may be provided along a single one of the major surfaces. Such a configuration may be particularly desirable when cooling relatively thin glass ribbons having a thickness of less than or equal to about 300 µm or other thicknesses where heat transfer across the thickness can be substantially uniform even when transferring heat from the ribbon along a single major surface of the glass ribbon.

Figure 4:
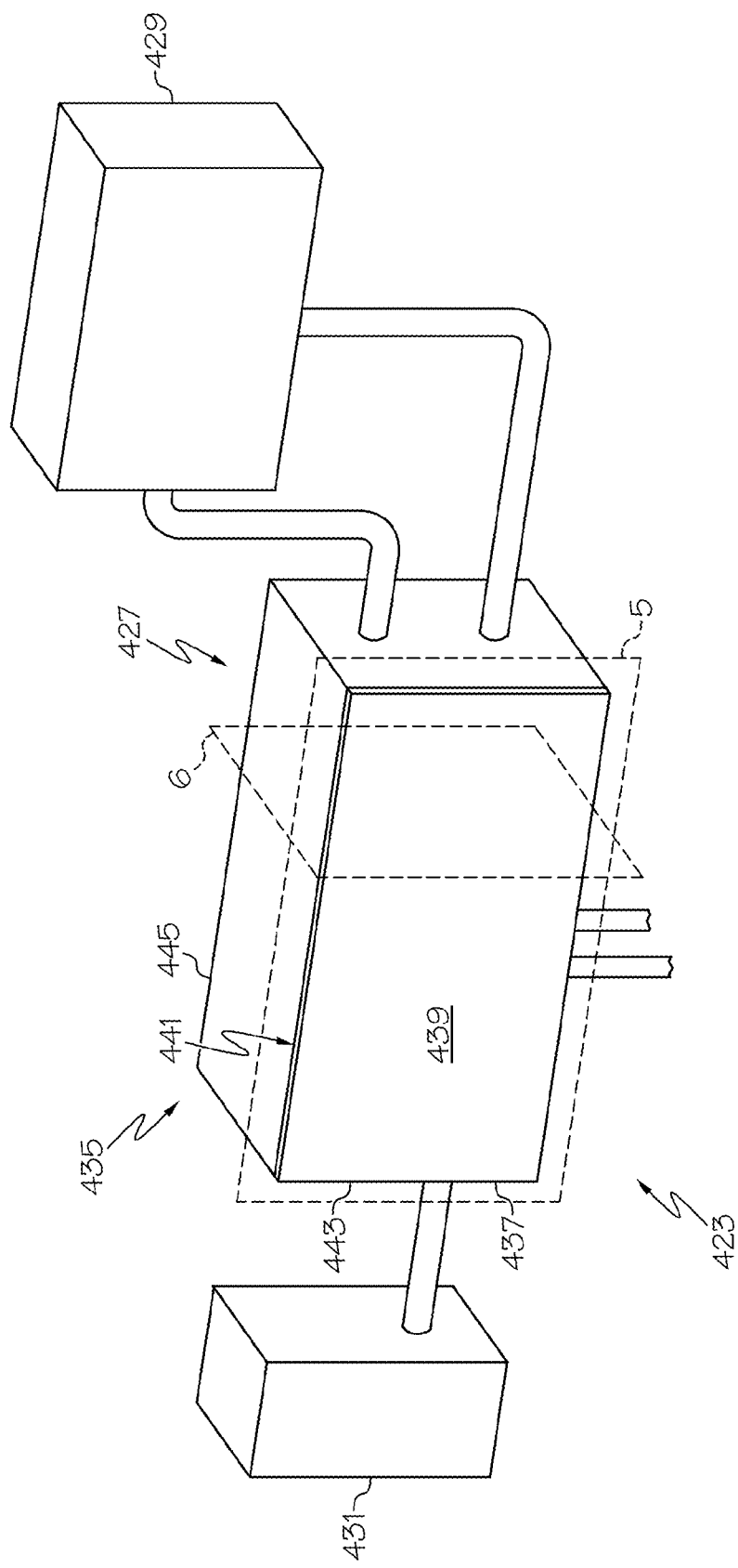
FIG. 4 schematically illustrates an example heat transfer unit that can be used for the glass manufacturing apparatus.
Figure 5:
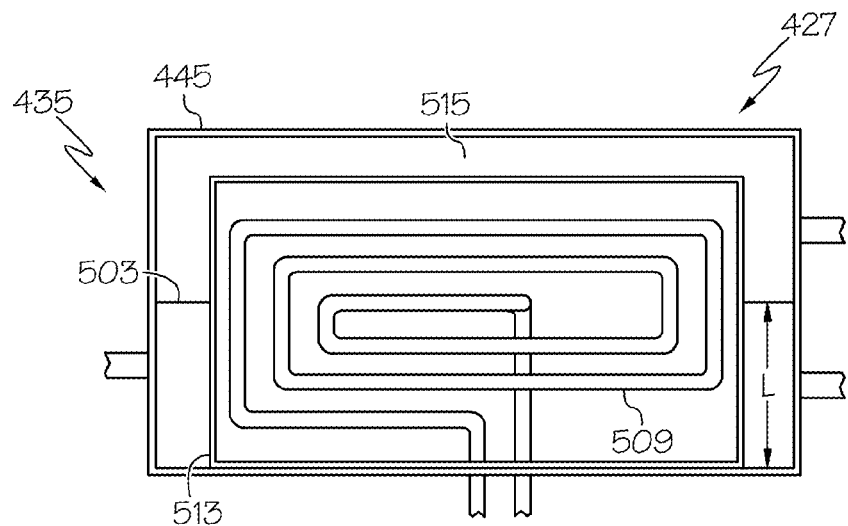
FIG. 5 is a cross-sectional view of an evaporator unit of the heat transfer unit taken along plane 5 in FIG. 4.
Figure 6:
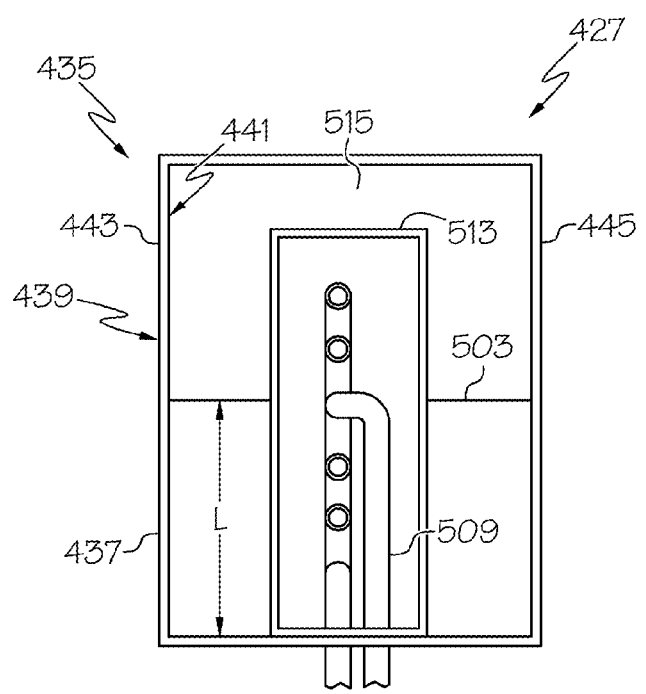
FIG. 6 is a cross-sectional view of the evaporator unit of the heat transfer unit taken along plane 6 in FIG. 4.

Turning to FIGS. 4-6, an example heat transfer unit 423 will now be described that can be used for one or more of the heat transfer units 223 discussed above. As shown, the heat transfer unit 423 can comprise an evaporator unit 427. In further examples, the heat transfer unit 423 can include an optional condenser unit 429 and/or an optional auxiliary liquid reservoir 431. The heat transfer unit 423 can also include a working fluid in the form of a working liquid 503 and/or a vapor. The evaporator unit 427 can comprise a liquid reservoir 435 and a heat transfer element 437. As can be seen in FIGS. 5 & 6, the liquid reservoir 435 is configured to receive the working liquid 503 and the heat transfer element 437 is configured to be placed in thermal contact with the working liquid 503 received in the liquid reservoir 435. The working liquid 503 may comprise water or any other type of liquid.

The heat transfer element 437 can define a wall portion of the liquid reservoir 435. For example, the heat transfer element 437 can define an entire wall of the liquid reservoir 435 or the heat transfer element 437 can define just a portion of a wall of the liquid reservoir 435. In some examples, the heat transfer element 437 could define more than just a wall portion of the liquid reservoir 435. For instance, the heat transfer element 437 could define the entire liquid reservoir 435. In the present example, as shown in FIGS. 4 & 6, the heat transfer element 437 is a plate having a first surface 439 and an opposing second surface 441 that defines an entire wall 443 of the liquid reservoir 435 that faces the first major surface 231 of the glass ribbon 103. The heat transfer element 437 is removably coupled to a remainder portion 445 of the liquid reservoir 435 to form a reservoir for the working liquid 503 to collect. The remainder portion 445 can comprise a non-conductive material such as a glass-ceramic or other non-metallic material though in some examples, the remainder portion 445 could additionally or alternatively comprise a thermally conductive material such as, for example, steel or some other metallic material.

The heat transfer unit 423 can be positioned such that the first surface 439 of the heat transfer element 437 faces and is spaced away from the first major surface 231 of the glass ribbon 103 being drawn from the glass manufacturing apparatus 101, thus permitting heat from the glass ribbon 103 to transfer radiantly to the first surface 439 of the heat transfer element 437. The heat transfer element 437 can be configured to cool the glass ribbon 103 by receiving the radiant heat from the glass ribbon 103 and transferring the heat to the working liquid 503 received in the liquid reservoir 435, thereby transforming an amount of the working liquid 503 to a vapor. For example, the heat transfer element 437 can comprise a thermally conductive material such as, for example, steel or some other metallic material, so that the heat transferred radiantly to the first surface 439 can then transfer via thermal conduction to the working liquid 503, which is in thermal contact with the second surface 441 of the heat transfer element 437. Eventually, if sufficient heat is transferred from the glass ribbon 103 to the working liquid 503, an amount of the working liquid 503 will transform to a vapor.

The heat transfer unit 423 can be configured such that the vapor produced in the evaporator unit 427 is delivered to the condenser unit 429, which is in fluid communication with the evaporator unit 427. For instance, the condenser unit 429 may be positioned relative to the evaporator unit 427 such that the vapor will naturally rise from the evaporator unit 427 to the condenser unit 429. The condenser unit 429 can be configured to then condense the vapor back to a condensed working liquid and deliver the condensed working liquid back to the liquid reservoir 435. More specifically, the heat transfer unit 423 can be configured such that the condensed working liquid is gravity fed to the liquid reservoir 435. For instance, the condenser unit 429 may be positioned partially or entirely above the evaporator unit 427 such that the condensed working liquid naturally falls from the condenser unit 429 to the liquid reservoir 435 of the evaporator unit 427. Additionally or alternatively, other mechanical and/or electrical means may be utilized to assist in feeding the condensed working liquid to the liquid reservoir 435. The evaporator unit 427 and the condenser unit 429 can thus form a closed loop system wherein the working fluid in the liquid reservoir 435 repeatedly absorbs heat from the glass ribbon 103 until it transforms from a liquid to a vapor, is then condensed back to its liquid form by the condenser unit 429, and is then delivered back to the liquid reservoir 435 to absorb further heat from the glass ribbon 103 until it again vaporizes.

The heat transfer unit 423 can further comprise an optional induction coil 509 configured to selectively provide electromagnetic energy to the heat transfer element 437. The induction coil 509 may be located outside of the liquid reservoir 435 or the induction coil 509 can be provided at least partially or, as shown in FIGS. 5 & 6, entirely within the liquid reservoir 435. Moreover, when positioned inside the liquid reservoir 435, the induction coil 509 can be provided within an isolation chamber 513 configured to isolate the induction coil 509 from contacting the working liquid 503 received in the liquid reservoir 435. Similar to the remainder portion 445, the isolation chamber 513 can comprise a non-conductive material such as a glass-ceramic or other non-metallic material though in some examples, the isolation chamber 513 could additionally or alternatively comprise a thermally conductive material such as, for example, steel or some other metallic material.

The heat transfer element 437 can be configured to convert the electromagnetic energy to heat and transfer the heat radiantly to the glass ribbon 103. For example, as discussed above, the heat transfer element 437 can comprise a thermally conductive material such as steel or some other metallic material. Conductive materials can act as susceptors which have the ability to absorb the electromagnetic energy and convert it to heat. Thus, the heat transfer element 437 can convert the electromagnetic energy from the induction coil 509 to heat that can then be radiantly transferred from the first surface 439 of the heat transfer element 437 to the glass ribbon 103. Moreover, in examples wherein the isolation chamber 513 and the remainder portion 445 comprise a non-conductive material, neither the isolation chamber 513 nor the remainder portion 445 will act as a susceptor for the electromagnetic energy provided by the induction coil 509. As such, a greater quantity of the electromagnetic energy can be converted by the heat transfer element 437, thus improving the effectiveness of the heat transfer element 437 as a radiant heat source for the glass ribbon 103.

The heat transfer element 437 described above can allow the heat transfer unit 423 to be operated as either a heat sink or as a heat source for the glass ribbon 103. The rate at which the heat transfer element 437 removes radiant heat from the glass ribbon 103 to be transferred to the working liquid 503 (i.e., the cooling rate of the heat transfer element 437) is governed by the Stefan-Boltzmann law where the radiative heat flux is given by:

$$Q = \epsilon \cdot \sigma \cdot A \cdot (T_1^4 - T_2^4)$$

Where:
$\epsilon$=emissivity of the heat transfer element
$\sigma$=Stefan Boltzmann's constant
A=Effective surface area of the first surface of the heat transfer element
$T_1$=Temperature of the glass ribbon
$T_2$=Temperature of the heat transfer element across its effective surface area Thus, the cooling rate Q of the heat transfer element 437 is dependent upon, inter alia, the effective surface area A of the first surface 439 of the heat transfer element 437 and the temperature $T_2$ of the heat transfer element 437 across its effective surface area A. Accordingly, as discussed in further detail below, these variables can be adjusted to regulate the cooling rate Q of the heat transfer element 437.

The effective surface area A of the heat transfer element 437 is substantially equivalent to the area of its second surface 441 that is in thermal contact with the working liquid 503 since the vapor region 515 of the liquid reservoir 435 will have a relatively limited contribution to the heat transfer process as the heat transfer coefficient of the vapor is magnitudes lower than that of the working liquid 503. Accordingly, the cooling rate Q of the heat transfer element 437 can be adjusted by adjusting the area of thermal contact between the working liquid 503 and the heat transfer element 437. Indeed, adjustment of the area of thermal contact between the working liquid 503 and the heat transfer element 437 will have a linear effect on the cooling rate Q of the heat transfer element 437 and is therefore an effective means of regulation.

The area of thermal contact between the working liquid 503 and the heat transfer element 437 can be adjusted, for example, by adjusting a level L of the working liquid 503 in the liquid reservoir 435. To adjust the level L, the condensing rate of the optional condenser unit 429 can be adjusted to increase or decrease the rate that condensed working liquid is fed back to the liquid reservoir 435. If the condensing rate is sufficiently decreased, there will not be enough condensed working liquid being fed back to liquid reservoir 435 to replace the working liquid 503 that is evaporating and the working liquid level L will decrease. Alternatively, if the condensing rate is sufficiently increased, the rate of condensed working liquid being fed back to liquid reservoir 435 will be greater than the rate of evaporating working liquid 503 and the working liquid level L will increase. The level L can also be adjusted using the optional auxiliary liquid reservoir 431. The auxiliary liquid reservoir 431, if provided, can be configured to selectively supply additional working liquid to the liquid reservoir 431 and/or selectively remove working liquid from the liquid reservoir 431, thereby adjusting the level L of working liquid 503 in the liquid reservoir 435.

As mentioned above, the cooling rate Q of the heat transfer element 437 is also dependent upon the temperature $T_2$ of the heat transfer element 437 across its effective surface area A. The temperature $T_2$ will be substantially equivalent to the saturation temperature of the working liquid 503 plus an increase dictated by the thickness and thermal conductivity of the heat transfer element 437. Accordingly, in addition or in alternative to adjusting the effective surface area A of the heat transfer element 437 as discussed above, the cooling rate Q of the heat transfer element 437 can be adjusted by adjusting the saturation temperature of working liquid 503, the thickness of the heat transfer element 437, and/or the thermal conductivity of the heat transfer element 437. For example, the cooling rate Q of the heat transfer element 437 can be adjusted by adjusting the saturation temperature of working liquid 503. In one example, the saturation temperature of the working liquid 503 can be adjusted by adjusting a fluid pressure of the working liquid 503 in the liquid reservoir 431. Increasing the fluid pressure will increase the saturation temperature while decreasing the fluid pressure will decrease the saturation temperature. In another example, the saturation temperature of the working liquid 503 can be adjusted by changing the composition of the working liquid. In the present example, the working liquid 503 comprises water. However, different liquids may be used that have different saturation temperatures.

As another example, the cooling rate Q of the heat transfer element 437 can be adjusted by adjusting the thickness of the heat transfer element 437. The thickness of the heat transfer element 437 may be adjusted by adding a thermally conductive layer to the first surface 439 and/or the second surface 441 of the heat transfer element 437. In addition or alternatively, the heat transfer element 437 may be removed from the remainder portion 445 and replaced with an alternative heat transfer element 437 having a different thickness.

As yet another example, the cooling rate Q of the heat transfer element 437 can be adjusted by adjusting the thermal conductivity of the heat transfer element 437. The thermal conductivity can be adjusted by adding a thermally conductive layer to the first surface 439 and/or the second surface 441 of the heat transfer element 437 that has a different thermal conductivity than the heat transfer element 437. In addition or alternatively, the heat transfer element 437 may be removed from the remainder portion 445 and replaced with an alternative heat transfer element 437 having a different thermal conductivity.

Figure 7:
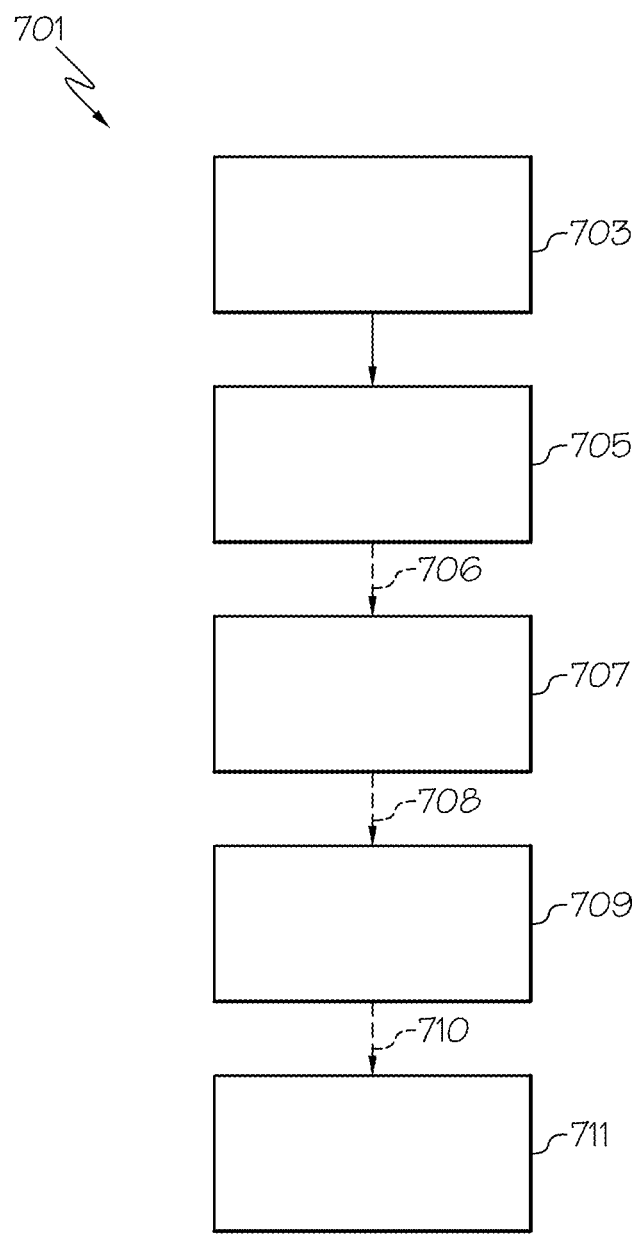
FIG. 7 is a flow chart illustrating steps of a method for manufacturing glass.

A method of manufacturing the glass ribbon 103 with the glass manufacturing apparatus 101 discussed above will now be described with respect to FIG. 7. The method 701 can include a step 703 of drawing the glass ribbon 103 from a quantity of the molten glass 121 in the forming wedge 201 in the draw direction 207. The method 701 can further include a step 705 of cooling the glass ribbon 103 by radiating heat from the glass ribbon 103 to the heat transfer element 437 of the heat transfer unit 423, and then transferring heat from the heat transfer element 437 to the working liquid 503 in the liquid reservoir 435, thereby transforming an amount of the working liquid 503 to a vapor. The amount can be all or just some of the working liquid 503 in the liquid reservoir 435. As indicated by broken arrow 706, the method 701 can further include an optional step 707 of condensing the vapor to a condensed working liquid and supplying the condensed working liquid to the liquid reservoir 435. For example, the vapor can be condensed using the condenser unit 429 discussed above. In one example, the condensed working liquid can be supplied to the liquid reservoir 435 by gravity feeding the condensed working liquid to the liquid reservoir 435. Although not shown, a pump may also be provided to supply working liquid from the condenser unit to the liquid reservoir.

In addition or alternatively, as further indicated by broken arrow 708, the method 701 can further comprise an optional step 709 of adjusting the cooling rate Q of the heat transfer element 437. The cooling rate Q can be adjusted using any of the techniques discussed above. For example, the cooling rate Q may be adjusted by adjusting the saturation temperature of the working liquid 503 in the liquid reservoir 435. For instance, the saturation temperature may be adjusted by changing the fluid pressure of the working liquid 503 in the liquid reservoir 435. As another example, the cooling rate Q may be adjusted by adjusting the area of thermal contact between the working liquid 503 and the heat transfer element 437 such as, for example, by adjusting the level L of the working liquid 503 in the liquid reservoir 435. As yet another example, the cooling rate Q may be adjusted by adjusting the thickness and/or the thermal conductivity of the heat transfer element 437. The cooling rate Q may be adjusted using any of the techniques discussed above, either individually or in combination with each other.

In addition or alternatively, as further indicated by broken arrow 710, the method 701 can further comprise an optional step 711 of supplying electromagnetic energy to the heat transfer element 437. For example, electromagnetic energy can be supplied to the heat transfer element 437 using the induction coil 509 discussed above. As mentioned above, the heat transfer element 437 is configured to convert the electromagnetic energy into radiant heat. The radiant heat will then be transferred radiantly to the glass ribbon 103.

Steps 705, 707, 709 and 711, if provided, can be carried out in any order. Moreover, steps 703 and 705 may be carried out alone or in combination with one or any combination of steps 707, 709, 711 and/or other steps.

It will be apparent to those skilled in the art that various modifications and variations can be made to the present disclosure without departing from the spirit and scope of the invention. Thus, it is intended that the present invention cover the modifications and variations of this disclosure provided they come within the scope of the appended claims and their equivalents.

What is claimed is:

1. A glass manufacturing apparatus to draw a glass ribbon comprising:

an evaporator unit comprising a liquid reservoir comprising a working liquid and a vapor in the liquid reservoir and a heat transfer element placed in thermal contact with the working liquid in the liquid reservoir, wherein the heat transfer element defines a wall portion of the liquid reservoir;

an induction coil provided within the liquid reservoir to selectively provide electromagnetic energy to the heat transfer element, and wherein the heat transfer element includes a surface positioned facing and spaced from a major surface of the glass ribbon to cool the glass ribbon being drawn from the glass manufacturing apparatus by receiving radiant heat from the glass ribbon and transferring the heat to the working liquid received in the liquid reservoir, thereby transforming an amount of the working liquid to the vapor.

2. The glass manufacturing apparatus of claim 1, further comprising a condenser unit in fluid communication with the evaporator unit, wherein the condenser unit is provided to condense the vapor to a condensed working liquid, and deliver the condensed working liquid back to the liquid reservoir.

3. The glass manufacturing apparatus of claim 2, wherein the condenser unit is positioned such that the condensed working liquid is gravity fed to the liquid reservoir.

4. The glass manufacturing apparatus of claim 1, further comprising an auxiliary liquid reservoir to selectively supply additional working liquid to the liquid reservoir.

5. The glass manufacturing apparatus of claim 1, wherein the heat transfer element is provided to convert the electromagnetic energy to heat and transfer the heat radiantly to the glass ribbon.

6. The glass manufacturing apparatus of claim 1, further comprising an isolation chamber to isolate the induction coil from contacting the working liquid received in the liquid reservoir.

7. The glass manufacturing apparatus of claim 1, wherein the working liquid is water.

8. The glass manufacturing apparatus of claim 1, wherein an area of the heat transfer element in thermal contact with the working liquid received in the liquid reservoir defines an effective surface area of the heat transfer element, and wherein adjusting the area of the heat transfer element in thermal contact with the working liquid received in the liquid reservoir correspondingly adjusts a cooling rate of the heat transfer element.

9. The glass manufacturing apparatus of claim 8, wherein the area of the heat transfer element in thermal contact with the working liquid received in the liquid reservoir is defined based at least in part on a level of the working liquid received in the liquid reservoir.

10. The glass manufacturing apparatus of claim 8, wherein the cooling rate of the heat transfer element is linearly dependent on the area of the heat transfer element in thermal contact with the working liquid received in the liquid reservoir.

11. A glass manufacturing apparatus to draw a glass ribbon comprising:
an evaporator unit comprising a liquid reservoir to receive a working liquid and a heat transfer element placed in thermal contact with the working liquid received in the liquid reservoir; and
an induction coil provided within the liquid reservoir to selectively provide electromagnetic energy to the heat transfer element; wherein
the heat transfer element is provided to cool the glass ribbon being drawn from the glass manufacturing apparatus by receiving radiant heat from the glass ribbon and transferring the heat to the working liquid received in the liquid reservoir, thereby transforming an amount of the working liquid to a vapor.

12. The glass manufacturing apparatus of claim 11, wherein the heat transfer element is provided to convert the electromagnetic energy to heat and transfer the heat radiantly to the glass ribbon.

13. The glass manufacturing apparatus of claim 11, further comprising an isolation chamber to isolate the induction coil from contacting the working liquid received in the liquid reservoir.

14. The glass manufacturing apparatus of claim 11, further comprising the working liquid, wherein an area of the heat transfer element in thermal contact with the working liquid received in the liquid reservoir defines an effective surface area of the heat transfer element, and wherein adjusting the area of the heat transfer element in thermal contact with the working liquid received in the liquid reservoir correspondingly adjusts a cooling rate of the heat transfer element.

15. The glass manufacturing apparatus of claim 14, wherein the area of the heat transfer element in thermal contact with the working liquid received in the liquid reservoir is defined based at least in part on a level of the working liquid received in the liquid reservoir.

16. The glass manufacturing apparatus of claim 14, wherein the cooling rate of the heat transfer element is linearly dependent on the area of the heat transfer element in thermal contact with the working liquid received in the liquid reservoir.

17. A glass manufacturing apparatus to draw a glass ribbon comprising:
an evaporator unit comprising a liquid reservoir comprising a working liquid and a vapor in the liquid reservoir and a heat transfer element placed in thermal contact with the working liquid in the liquid reservoir, wherein the heat transfer element defines a wall portion of the liquid reservoir,
an induction coil provided within the liquid reservoir to selectively provide electromagnetic energy to the heat transfer element;
wherein the heat transfer element is provided to cool the glass ribbon being drawn from the glass manufacturing apparatus by receiving radiant heat from the glass ribbon and transferring the heat to the working liquid received in the liquid reservoir, thereby transforming an amount of the working liquid to the vapor, and
wherein an area of the heat transfer element in thermal contact with the working liquid received in the liquid reservoir defines an effective surface area of the heat transfer element, and wherein adjusting the area of the heat transfer element in thermal contact with the working liquid received in the liquid reservoir correspondingly adjusts a cooling rate of the heat transfer element.

18. The glass manufacturing apparatus of claim 17, wherein the area of the transfer element in thermal contact with the working liquid received in the liquid reservoir is defined based at least in part on a level of the working liquid received in the liquid reservoir.

19. The glass manufacturing apparatus of claim 17, wherein the cooling rate of the heat transfer element is linearly dependent on the area of the heat transfer element in thermal contact with the working liquid received in the liquid reservoir.

20. The glass manufacturing apparatus of claim 17, further comprising an isolation chamber to isolate the induction coil from contacting the working liquid received in the liquid reservoir.

* * * * *